United States Patent [19]
Krebs

[11] Patent Number: 5,153,878
[45] Date of Patent: Oct. 6, 1992

[54] RADIO DATA COMMUNICATIONS SYSTEM WITH DIVERSE SIGNALING CAPABILITY

[75] Inventor: Jay R. Krebs, Crystal Lake, Ill.

[73] Assignee: Motorola Inc., Schaumburg, Ill.

[21] Appl. No.: 448,499

[22] Filed: Dec. 11, 1989

[51] Int. Cl.$^5$ .............................................. H04J 3/16
[52] U.S. Cl. ................................. 370/95.1; 455/53.1
[58] Field of Search ................. 370/95.1, 95.3, 85.2, 370/85.7, 82; 455/33, 53, 54, 56, 57; 379/58, 59, 63; 364/900

[56] References Cited

U.S. PATENT DOCUMENTS

| | | | |
|---|---|---|---|
| 4,519,068 | 5/1985 | Kerbs et al. | 370/82 |
| 4,677,611 | 6/1987 | Yanosy, Jr. et al. | 370/85.2 |
| 4,965,771 | 4/1990 | Morikawa et al. | 364/900 |
| 5,012,469 | 4/1991 | Sardana | 370/95.3 |

*Primary Examiner*—Curtis Kuntz
*Assistant Examiner*—T. Ghebretinsae
*Attorney, Agent, or Firm*—Donald B. Southard

[57] ABSTRACT

Method and apparatus are disclosed for accommodating diverse signalling methods and protocols within a single, unified Radio Data Communications system without interference. In this way, improvements and new products may be integrated within a pre-established communications system without the need of discarding older equipment. Further, separate operating systems may be effectively merged without permanently modifying the merged system to one or another of the previous systems' signalling formats.

13 Claims, 3 Drawing Sheets

RADIO DATA COMMUNICATIONS SYSTEM WITH DIVERSE SIGNALING CAPABILITY

BACKGROUND OF THE INVENTION

This invention relates in general to radio data communication systems and more particularly to such systems capable of accommodating multiply and diverse signaling schemes or protocols operable within a single, unified communication network.

Radio data communications systems typically comprise a centrally located controller——i.e., Network Control Processor (NPC)——connected, such as by wire line, to a plurality of remote, but fixed RF transmitting stations, which collectively define the coverage for a given area/system. The NCP, in turn, is connected to and is controlled by a Host Computer.

The individual RF stations conventionally include a local controller——i.e., General Communications Controller (GCC)——and an associated transmitter/receiver (transceiver). The individual RF stations are all connected to the central NCP to thus form the particular Data Network which communicates with a plurality of portable/mobile (remote)radio data terminals transportable throughout the particular coverage area.

There are a number of particularized characteristics of such radio communication systems which distinguish then from the more conventional and widely known two-way radio voice communication systems. Although not specifically limited thereto, nevertheless, such radio data systems normally utilize two separate channels, namely, an inbound channel on which the remote terminals communicate with the central NCP, and an outbound channel on which the central NCP selectively communicates with the individual remote terminals.

In operation, the remote (portable/mobile) terminals monitor the outbound channel to determine whether any activity by others is occurring on the inbound channel. If not, the terminal is free to send its intended message on the inbound channel. If the remote terminal senses channel activity, it refrains from transmitting and retries later, usually on a random basis. To enable the remote terminal to determine whether or not there is channel activity, the NCP/GCC utilizes an inhibit signal comprising a stream of bits, termed "busy bits", which are appropriately embedded in the messages constituting the outbound channel message stream whenever a transmission is occurring on the inbound channel. If the busy bits are present, the operating channel for the remote terminal is deemed busy. If they are not present, the channel is deemed free for use (at least for contention). With this type of an arrangement, obviously the NCP/GCC must be sending a message continuously or nearly so on the outbound channel so that it may be frequently monitored for presence or absence of embedded busy bits. If the NCP is not sending specific messages to specific remote terminals, idle messages are employed in their stead.

Obviously, with the foregoing arrangement, there must be some manner of traffic control or rules of operation that must be implemented so as to enable efficient and effective operation. These operating rules may be considered as including a particular method or mode of signaling, encoding and decoding activities reading the transmitted received data, a method and means of accessing the associated operating channel, the rules for retry when access is denied, and possible acknowledgements back to the sending party when confirmation is wanted by the sending party regarding messages sent. Collectively, such rules combined in a particular way may be termed the "operating protocol" for the radio data system. Accordingly, until now, the particular system could only accommodate additional terminals/equipment that operated in the already established system protocol, either as "add-ons" to expand the system, or simply as replacement units.

As those skilled in the art are aware, time passes and new technologies and innovations result in significant improvements in all phases of system operation, and particularly with respect to more efficient and effective operating formats or protocols. It frequently proves advantageous for a manufacturer to redesign for any number of reasons, including by way of example and not limitation, message throughput, channel efficiency, cost——to name but a few. However, a significant user base may well have been established in the particular (old) signaling scheme which in the interest of economics and good business practice require such established formats or signaling protocols to be maintained and limit replacement products to those compatible therein. It would, of course, be desirable in the best interests of user economics as well as "customer satisfaction" to offer any new radio data products that are operable on the user's existing system——and then provide a graceful migration to "new" signaling scheme options. By graceful migration, it is meant the ability to offer a system upgrade capability to the existing user base that offers the demonstrable improvements of a "new" signaling format but does not require the wholesale replacement of existing and fully operational units as well as minimizing fixed network infrastructure changes with associated network downtime.

SUMMARY OF THE INVENTION

Accordingly, it is an object of the present invention to provide a new and improved RF Radio Data Communication System wherein multiple signaling schemes or protocols may be effectively accommodated and wherein units of one manufacturer or several different manufacturers are fully integratable therein.

A more particular object of the present invention is to provide an RF Radio Data Communication System of the foregoing type wherein a methodology is adopted to permit entirely dissimilar signaling schemes or protocols to operate on the same radio channel without interference among the system terminals themselves by utilizing a time multiplex bases.

In practicing the invention, a radio data communication system is provided for operation on inbound and outbound channels wherein a centrally located NCP and respective RF Stations are capable of operating with multiple signaling formats and wherein a plurality of remote terminals each have a capability of operation on at least one of such signaling formats. These signaling formats or operating schemes are time division multiplexed wherein each such signaling format is relegated to a particularized time slot. These time slots are each preceded by the transmission of an appropriate synchronization signal so as to enable synchronization of all such remote terminals that are capable of operating on the particular signaling format in the following established time slot. Means are included to maintain any on-going messages in its particular signaling format across time multiplex boundaries until the completion of such message transmission.

BRIEF DESCRIPTION OF THE DRAWINGS

The features of the present invention which are believed to be novel are set forth with particularity in the appended claims. The invention itself, however, together with further objects and advantages thereof, may be best understood by reference to the accompanying drawings, in which:

DESCRIPTION OF THE PREFERRED EMBODIMENT

Figure 1:
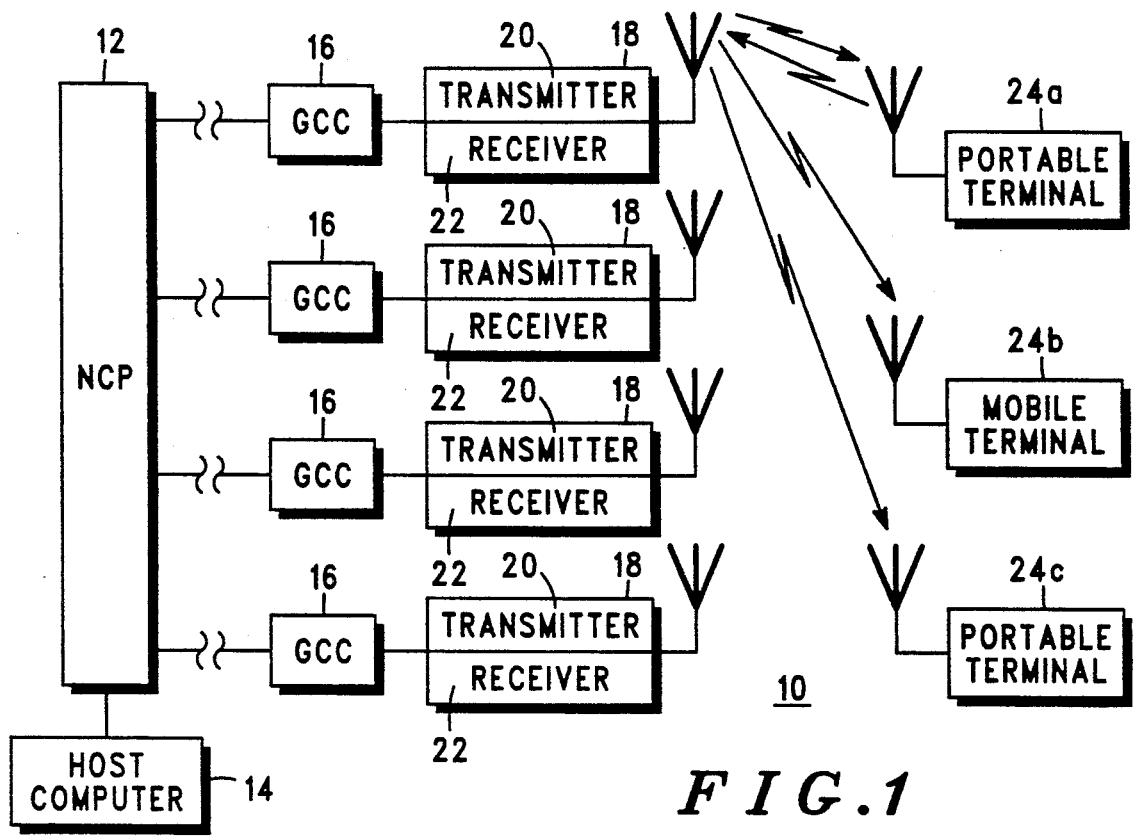
FIG. 1 is a block diagram of a Radio Data Communication System that may advantageously utilize the present invention.
Figure 2:
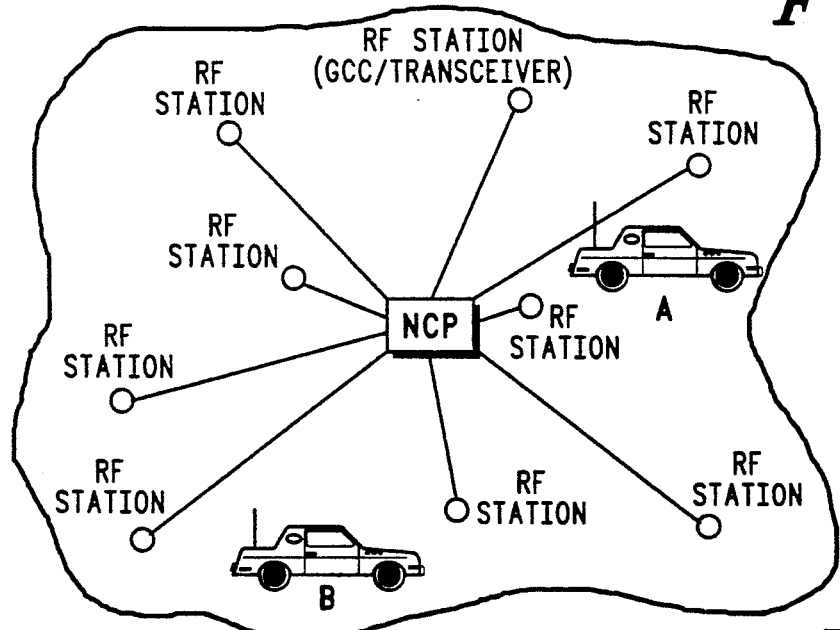
FIG. 2 is a graphic representation of such a system of FIG. 1 operating in a defined geographic are covered by multiple sites, and wherein multiple signaling formats or protocols may be accommodated.

Referring now to the drawings, a Radio Data Communication System 10 as shown in FIG. 1 which may advantageously utilize the present invention. The system as illustrated includes a centrally located Network Control Processor (NCP) 12 interconnected to, and controlled by a Host Computer 14. The NCP 12 is selectively interconnected, say as for example, by a leased line to a plurality of General Communication Controllers (GCC) 16. These GCC's in turn are connected to and control an associated transmitting site or station 18, each comprising a local transmitter 20 and a receiver 22. The GCC's and associated station equipment are selectively located within a given geographical area to define the boundaries of a particular Radio Data Communication System, as will be better described in connection with FIG. 2 et seq. The RF station 18, controlled by an associated GCC 16, and in turn by the NCP 12, communicate with a plurality of portable/mobile (remote) radio data terminals such as indicated at 24a, 24b and 24c, moving within and about the defined geographical coverage area.

Although not so indicated in the block diagram of FIG 1, each of the portable/mobile (remote) terminals 24a, 24b and 24c may individually be designed to operate on differing signalling formats or operating protocols.

As is known to those skilled in the art, there are certain general operating requirements common to all such signalling schemes. For example, such systems generally need to be a packet RF data arrangement wherein an inbound channel is utilized by the respective remote terminals in communicating to the central NCP which in turn selectively communicates with the remote terminals over an associated but separate outbound channel.

Using contention, multiple access rules, i.e. CSMA, DSMA, DTMA, etc., the remote terminals gain access to such inbound channel by first decoding a signal on the outbound channel that indicates the inbound channel is free of radio data traffic. Once the channel is determined to be free of radio traffic, the remote terminal may send its intended message in the form of individual data packets and then wait on the outbound channel for an acknowledgement. Collisions, of course, may occur between contending remote terminals depending on how rapidly the NCP can detect inbound transmissions and set (embed) the busy bits within the outbound channel message stream. When collisions do occur on when inbound channel activity is determined a present, the remote units are programmed to retry on some particular set basis, usually on a random try variable.

Accordingly, it will be appreciated that for the particular signalling arrangement to occur in proper time sequency and as intended, appropriate synchronization signals must be sent to synchronize all associated units within the system. Further, the same type of encoding and decoding activities must be effected between the separate units as well. If the wrong synchronization signal is sent, it will not be recognized by a remote terminal looking for a different synchronization word. Similarly, incompatible encoding/decoding processes between remote terminals and centrally fixed GCC's and/or NCP's will effectively prevent any meaningful communications therebetween.

Figure 3:
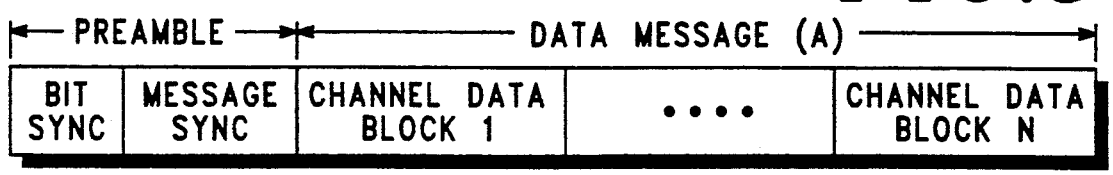
FIG. 3 is a diagrammatic representation of a particular signaling format of one type of signaling arrangement.

One such signalling arrangement, by way of example only an not intended as a limitation, that conforms to the foregoing general operating characteristics may be identified as the MDC4800 signaling arrangement developed by Motorola, Inc. FIG. 3 indicates the general format thereof which consists of a preamble formed by bit and message synchronization words or fields, followed by one or more channel data blocks constituting the physical data message that is desired to be communicated. The first channel data block includes an information field having at least one command and a station address, with a parity field coded form the information field in accordance with a predetermined code. The second channel data block may include an information field with a block count to indicate the number of flowing data blocks, a message sequence number incremented for each message and a check word an, finally, a parity field coded from the information field according to the referenced predetermined code. The third and following channel data blocks include information fields which include data, and a similarly coded parity field. If a more detailed description is wished, reference may be made to U.S. Pat. No. 4,519,068, issuing to Jay Krebs and Thomas Freeburg, and assigned to the same assignee as the present invention.

Figure 4:
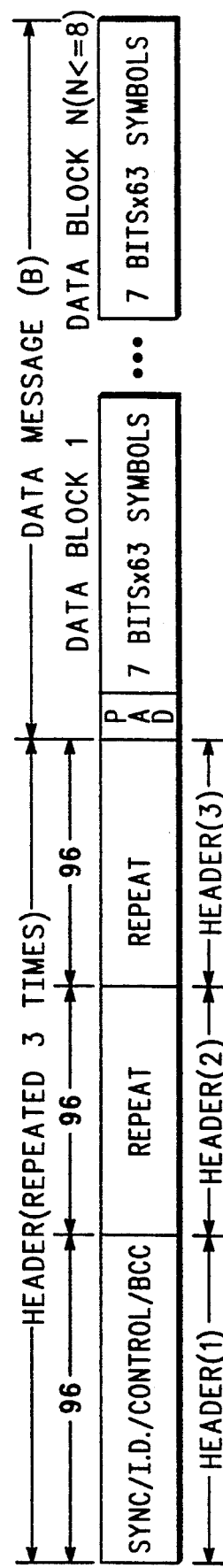
FIG. 4 is a diagrammatic representation of a particular signaling format of still another type of signaling arrangement.

Still another signalling arrangement, by way of example only, and not as a limitation, is shown in FIG. 4 which has been developed by Mobile Data International, Inc. and which for purposes of convenience may be referred to as the MDI 4800 signalling arrangement. As shown, this signalling format utilizes a header portion which includes synch and other identified signaling information and which requires some 96 bits in length. This arrangement chooses to repeat the header a total of three times before sending the associated data blocks. The data blocks themselves employ a specie of the well-known Reed Solomon code for error correction. The data itself is arranged in a format of 45 6-bit information symbols and 18 6-bit parity symbols for a total of 63 6-bit symbols. As a point of interest, the 7th bit in each symbol in intended to function as the required "inhibit" bit (when needed to show channel activity).

In any event, each of the signalling formats as depicted in FIGS. 3 and 4 include a preamble (or header) for synchronization purposes. However, they nevertheless are different in content and as such would be recognized only by terminals having the same signalling format programmed therein and not the other. Moreover, the data message formats differ as well as do the encoding/;decoding particulars. It should not be surprising, then, that without more, such reference signalling formats would not be compatible or function as intended in a signal RF Radio Data Communication System.

It is to be noted that many other signalling schemes are in existence in addition to those as depicted in FIGS. 3 and 4, included here only as illustrative examples. As such, all would be incompatible in a single system for one reason or another, such as, differing synchronization fields or words, different encoding/decoding processes, different throughput rates, to name but a few of the particular parameters.

This invention solves the problem of incompatible signalling arrangements as above referenced, as well as still others undefined, by utilizing a methodology and apparatus so as to permit these differencing signalling arrangements to nevertheless operate on the same radio channel without interference. Of course, it is to be understood that these two illustrated formats are by way of examples only and, in point of fact, three or more signalling systems may well be possible to operate on the same channel utilizing the teachings of the present invention.

The present invention relies on two principle fixed network capabilities. First, each GCC 16 and associated RF station 18 must be capable of recognizing, data detecting and decoding all signalling systems of interest, whether two, three or more. Further, each such GCC and RF station must also have the capability of encoding these same signalling formats based on a control command from the centrally located NCP 12. In addition, such GCC upon data detect from either signalling arrangement on the inbound channel must be able to generate appropriate inhibit bits for embedding in the outbound message stream. For implementation convenience, the GCC will preferably reformat the RF messages into a common packet format suitable for further processing by the central NCP.

Further, if the RF Radio Data Communication System is of the type in which acknowledgements are sent by the receiving terminal or station, the central NCP must be capable of generating the appropriate acknowledgements to inbound data message according to the received signalling format, and then format the appropriate outbound message with regard to the particular signalling format understood by the target remote terminal unit. Finally the NCP must divide the outbound channel into a appropriate time slots or schedules so as to accommodate each of the signalling schemes of interest, according to some predetermined arrangement, such as traffic demand or the like.

In addition, each of eh portable/mobile (remote) terminals must have the capability of encoding and decoding at least one of the particular signalling systems of interest as well as having a channel access methodology which involves synchronization to the outbound data stream and inhibits signal detection once such synchronization is achieved or a time-out occurs leading to the decision to transmit in the absence of a decodable outbound data stream. And, of course, such remote terminals must themselves be capable of generating appropriate acknowledgements in response to received messages in the outbound channel.

Figure 5:
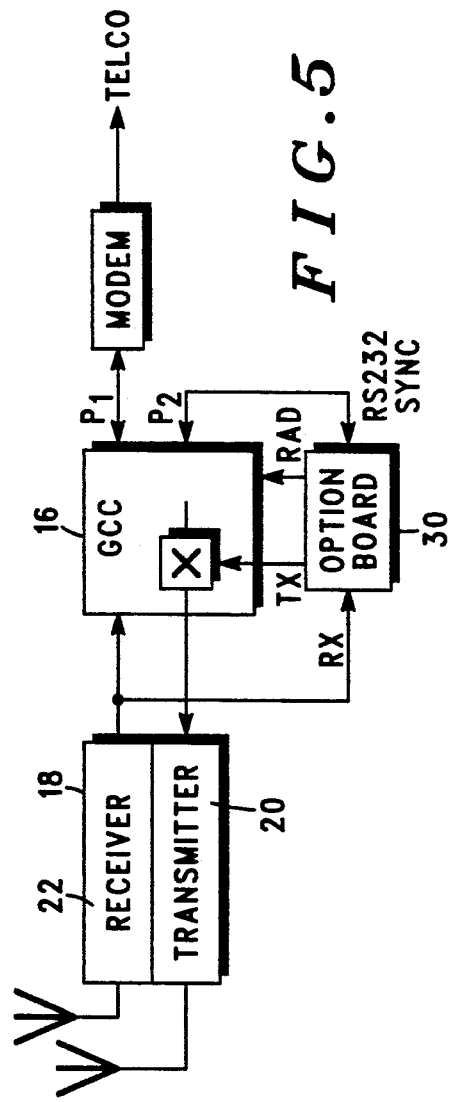
FIG. 5 is a block diagram of an associated RF Station having the capability to operate on several but completely independent and separate signaling formats.

As state previously, the system GCC and associated RF stations must be capable of data detecting and otherwise decoding the respective signalling arrangements of interest. One way, by way of example only, is shown in FIG. 5. No further modification is of course necessary with respect to the transmitter 20 and receiver 22 of the RF station 18. It need only transmit and receive the signalling and other data information. The GCC 16, in this example, may be considered an initially designed to function with the Motorola MDC4800 signalling scheme of FIG. 3. Without more, it will be appreciated that it is incapable of demodulating the three-level, alternate mark inversion signalling embodied in the MDI4800 signalling format as depicted in FIG. 4.

However, a separate option board such as that identified at 30, may be provided which is capable of performing all of the necessary MDI signaling functions and interfaced to the GCC as shown at the customarily provided RS232 serial port wherein the message may then be further processed by the GCC once the aforesaid demodulation and other parameters of the MDI signalling has been effected. This permits the GCC so modified in conjunction with the associated RF station to then function in both signalling scheme arrangements. The added option board 30 may be added at the factory or even as a field retrofit for existing systems.

Figure 6:
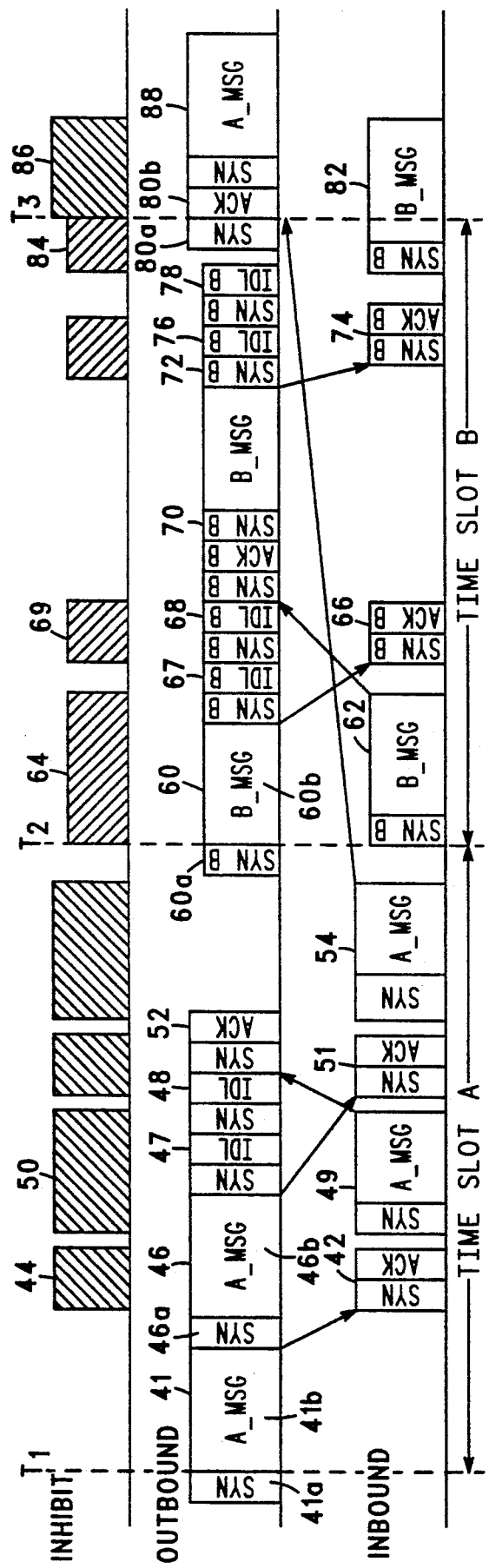
FIG. 6 is a timing diagram by way of example showing inbound and outbound traffic which is illustrative of the time division multiplexing so as to permit the accommodation of multiple signaling formats or protocols.

For a better understanding of the general operation of the overall system, reference is made FIG. 6, setting forth a timing diagram for such system capable of operating with both the signalling formats of FIGS. 3 and 4. In the diagram, it will be noted that separate time slots have been provided. One T1–T2(identified further as time slot A) for the MDC4800 signalling scheme of FIG. 3, hereinafter designed Type A, and another time slot T2–T3 (identified further as time slot B) for the MDI4800 signalling scheme depicted in FIG. 4, hereinafter designated Type B.

Starting at the left of FIG. 6, it is assumed that the synchronization field or word for the Type A signalling has been sent and the associated remote terminals capable of Type A signalling have received and decoded such sync word, designated at 41a, and are thus capable of decoding the following message portion, designated at 41b, which starts precisely at time T1. The remote terminals of Type B ignore this synchronization word and following data message since none utilizes this type of signaling format (signalling Type B) and are unable to decode the same.

The target remote terminal, however, does recognize the message, which contains its address, and upon monitoring the outbound channel determines there is no inbound channel activity by reason of the absence of an inhibit signal, or "busy" bits embedded in the outbound channel message stream. This enables such remote terminal to respond by sending an acknowledgement signal, identified at 42, to the NCP. It will be noted that very shortly after the generation of the acknowledgement signal 42, an inhibit signal comprising the aforementioned embedded busy bits appears in the outbound channel message stream, as indicated at 44.

In the meantime, messages continues to be transmitted on the outbound channel without interruption, as indicated by the transmission 46, comprising sync word 46a and message portion 46b, as well as a series of transmission comprising sync words and idle words which are utilized when no specific messages are queued up and waiting for transmission to target remote terminals, such as indicated at 47 and 48.

At the same time, intermediate the sending of transmissions 46 and 47, a type A remote terminal is shown as monitoring the inbound channel and finding it free for use, i.e., an absence of busy bits in the outbound channel stream, proceeds to originate and transmit an inbound signal as indicated in 49, comprising a sync word and a message word portion as indicated. This transmission causes an inhibit signal, identified at 50, to appear in the outbound message stream, during the occurrence thereof so as to prevent the acknowledgement signal at 51, in response to the outbound message transmission 46, from being transmitted until the cessation of such transmission 49. Acknowledgement signal at 52 in response to transmission 49 is shown as occurring after the termination of transmission 48.

Finally, a further message transmission at 54 is shown as being generated by a type A remote terminal at a time when the inbound channel is free for use following the cessation of transmission 51. However, prior to the time from when the NCP would have received such transmission and then respond thereto with an acknowledgement signal, time frame T1-T2 is lapsing and at a time window immediately preceding the beginning of time juncture T2, the sync field or word 60a is transmitted so that all type B terminals will then recognize and be able to sync up at that time. Then precisely at the start of time juncture T2, the message portion 60b of transmission 60 is sent on the outbound channel.

At the same time, in the example shown, a type B remote terminal is shown as originating a transmission at 62 on the inbound channel, thereby causing an inhibit signal to be generated at 64 so as to prevent other remote terminals from contending for the inbound channel. Upon cessation of transmission 62, the target remote terminal of message 60b ( the inhibit signal 64 ceases as well) is then able to effect an acknowledgement signal as shown at 66.

In the meanwhile, the NCP continues to send messages, in this case, idle message 67 and 68, because no other specific data message is waiting to be transmitted at that juncture in the examples give. Following the acknowledgment signal transmission 66, the NCP in conjunction with a associated GCC 16 and RF station 18 acknowledges the transmission at 70 the previously received message in transmission 62.

In the example given, a normal data message transmission that has been queued up is then transmitted at 72 which is then acknowledged at 74 by the target and remote terminal Since there is no inhibit signal present in the outbound channel stream at that moment, the outbound channel, in the example shown, then includes several more idle messages such as shown at 76 and 78.

At a time just preceding the time juncture T3 the NCP again sends out the sync word for type A signaling and all of the units capable of such signaling detect and decode the same and are then synched up by the time the T3 juncture arrives. However, in the example given, a remote terminal 24, operating on type B signaling has already originated a transmission at 82. Such message transmission is not completed by the time the T3 juncture arrives, and thus the particular remote terminal continues on to the completion. This causes an inhibit signal 84 in type B signaling which was set upon the origination of transmission 82 to change to a type A inhibit signal at 86 at the T3 juncture and is operative to keep any now properly synched up type A remote terminals from contending for the inbound channel until the transmission 82 is in fact completed by the particular type B remote terminal. However, even while transmission 82 is occurring on the inbound channel, the NCP and appropriate GCC/RF station may nevertheless originate and send out the appropriate type A signaling acknowledgement shown at 80 in response to the previous type A transmission 54 occurring back within the time frame T1-T2, which occurring back within the time frame T1-T21, which acknowledgemetn was not possible at that time because the arrival of the time juncture T2 and the change in the signaling format effected at that time.

Figure 7:
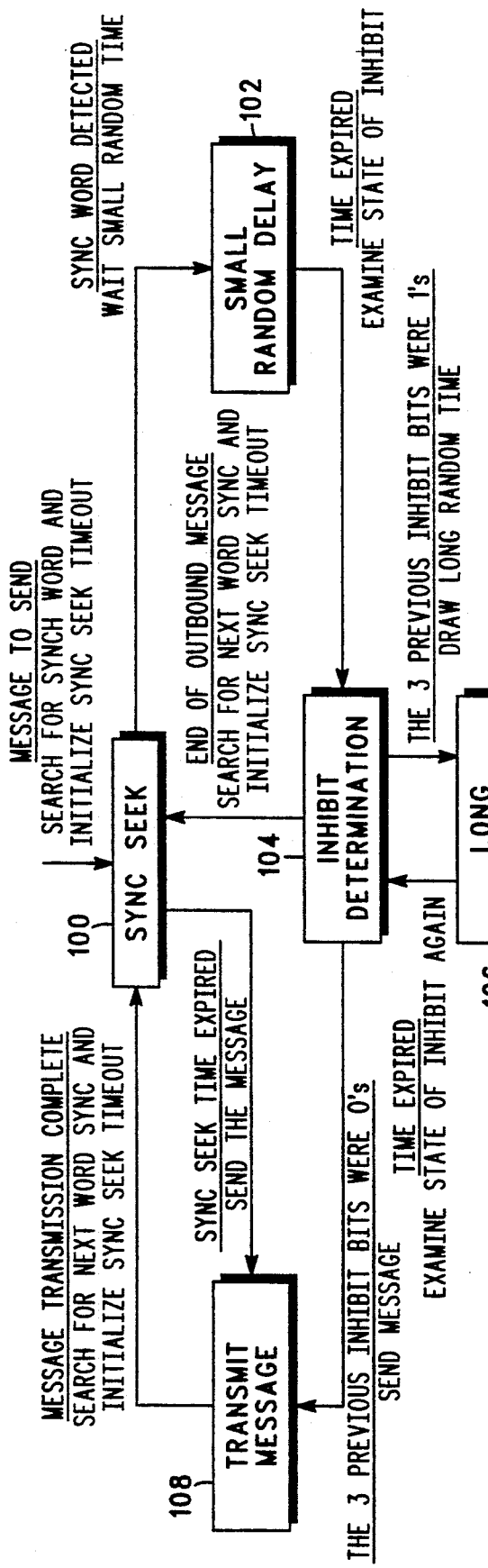
FIG. 7 is a state transition chart showing appropriate channel access methodology of at least one type for an associated remote data terminal in acquiring synchronization and subsequent access to the operating channel.

A state transition diagram is shown in FIG. 7 which indicates the various transitional stages a remote terminal of either signaling type will generate in contending for access to the inbound channel and sending a message to the NCP. Whenever such remote terminal 24 has a message to send, it first initiates a search for tis particular synch word type and then initializes an inhibit synch seek timeout timer as indicated at step 100. If the synch word is in fact detected before the timeout timer expires, the terminal waits a relatively small random time at step 102, after which it examines the "State of Inhibit" at step 104. If the three previous inhibit bits embedded in the outbound channel message stream are detected of a particular value, say, all one's (1), then the terminal is programed to enter a still longer random time delay, at step 106, before retrying for channel access again.

If on the other hand, the three embedded inhibit bits are detected of another particular value, such as all zero's (0), then it is free to send its message, such as shown at step 108. After completing the message transmission, the remote terminal then enters the stage where it is free to again seek its type of synch word as before.

In addition, if the remote terminal does not find its type of sync word before the synch word timeout timer operates (expires), it is then free to send the message at step 108.

It should be pointed out that employing the random timers 102 and 106 referenced in FIG. 7 is intended as an illustrated example only. Other delay mechanisms are possible and in face have been utilized. One such arrangement employs a "virtual clock" and is usually referred to as VT-CSMA protocol.

VT-CSMA is a variation on non-persistent CSMA. CSMA listens to the channel to see if it is unoccupied before a packet is transmitted. If the channel is busy, the unit waits a random time and tries again. With VT-CSMA, the channel is also monitored for a busy state. However, instead of waiting a random time before attempting transmission again, the unit is put on "hold" while the channel is busy. When the channel is idle once more, the backlog of packets is cleared out at a controlled rate on a first-come first-served basis, based on when the packet was generated. This is done by a so-called "virtual clock", which stops when the channel is busy, and then runs at an accelerated rate when it becomes idle, until the backlog is cleared. Contention is thereby resolved not through random retransmission timers, but through random packet arrival times. The result of this is a maximum throughput equal to no-persistent CSMA, but delays that ar smaller. The protocol can also adjust to channel loading, bu adjustment of the virtual clock rate. A modification of VT-CSMA called VT-CSMA with collision detect (VT-CSMA/CD), improves performance further, by detecting collisions on packets as they occur, and then immediately aborting transmission. However, this requires the unit to monitor the channel as it si transmitting, implying duplex operation.

In this manner, an RF Radio Data Communications System may effectively accommodate two or more completely diverse signalling formats or protocols without interference therebetween. Thus, such system may be updated from time to time ti take advantage of meaningful signaling improvements without discarding older equipment and the like. Moreover, communications systems with diverse signalling arrangement may simply be combined in the interests of efficiency or other parameters.

What is claimed is:

1. In an RF Radio Data Communications system operating on inbound and outbound channels with multiple transmitting sites interconnected to a centrally located NCP and a plurality of protable/mobile remote transceiver terminals, a method of accommodating two or more signalling formats or protocols concurrently within the communication system without interference therebetween including the steps of:
   programming the central NCP and each of the RF transmitting sites to be capable of operating on each of the signaling formats of interest;
   programming one or more (each) of the remote transceiver terminals with the capability of operating on a particular (at least) one of the signalling formats of interest and one or more others of the remote transceiver terminals on a different signalling format of interest;
   time division multiplexing each of said signalling formats of interest into a particular, reoccurring time slot, on both inbound and outbound channels; and
   operating said central NCP and RF transmitting sites on a particular signalling format only within its assigned multiplexed time slot.

2. A method of accommodating multiple signaling formats on a single RF Radio Data Communication system in accordance with claim 1 which includes the further step of transmitting on the outbound channel a sync word of the desired signaling format immediately prior to the assigned time slot designated for such desired signaling format.

3. A method of accommodating multiple signaling formats on a signal RF Radio Data Communication System in accordance with claim 1 including the step of establishing inhibit signals comprising busy bits embedded in the outbound channel message stream whenever inbound channel activity is detected by the NCP.

4. A method of accommodating multiple signaling formats on a single RF Radio Data Communication System in accordance with claim 32 including the further step of maintaining said established inhibit signals whenever a transmission on the inbound channel occurs which transpires across time slot junctures, but changing the signalling format of said continuing inhibit signal as it transpires across any said time slot juncture.

5. A method of accommodating multiple signaling formats on a single RF Radio Data Communication System in accordance with claim 1 wherein the further step is included of acknowledging back by a system remote terminal or the NCP whenever one receives a message transmission from the other.

6. A method of accommodating multiple signaling formats on a single RF Radio Data Communication System in accordance with claim 5 wherein the step of acknowledging back includes the capability of so acknowledging in a time slot different from the one in which the message transmission is received if the total time is not sufficient to initiate and complete the required acknowledgment in said one time slot.

7. An RF Data Communication System operating on inbound and outbound radio channels with multiple transmitting sites interconnected to a centrally located NCP and the plurality of portable/mobile remote transceiver terminals, and wherein multiple signalling formats or protocols may be accommodated concurrently within (with) the communication system without interference therebetween, comprising in combination:
   means for selectively operating the central controller (NCP) and associated fixed transmitting sites on each of the signalling formats of interest;
   means for operating one or more (each) of the plurality of remote portable radio data transceiver terminals on a particular(at least) one of the signalling formats of interest and one or more others of the remote radio data transceiver terminals on a different signaling format of interest;
   means for time division multiplexing each of said signaling formats or interest into a particular recurring time slot on both inbound and outbound channels,
   said last-named means further including means whereby each such slot is preceded by the transmission on the outbound channel of the appropriate synchronization signal to synchronize the respective remote terminal capable of operating on that particular signaling format within said particular time slot.

8. An RF Radio Data Communication System in accordance with claim 1 wherein means are included to transmit on the outbound channel a sync word of the desired signalling format immediately preceding an assigned time slot designated for such desired signaling format.

9. An RF Radio Data Communication System in accordance with claim 7 which further includes means to establish inhibit signals comprising busy bits embedded in the outbound channel message stream whenever inbound channel activity is detected by the NCP.

10. An RF Radio Data Communication System in accordance with claim 9 wherein means are included to maintain said established inhibit signal whenever a transmission on the inbound channel occurs which transpires across a time slot juncture, said means changing the signalling format of said continuing inhibit signal as it transpires across said time slot juncture.

11. An RF Radio Data Communication System in accordance with claim 7 which further includes means for acknowledging back by a system remote terminal or the NCP whenever one receives a message transmission by the other, said means having the capability of acknowledging in a time slot different that the one in which the message transmission is initially received if sufficient time is not present to initiate and complete the required acknowledgement in said one time slot.

12. In an RF Radio Data Communication System operating on the inbound and outbound radio channels and having at least one transmitting site connected to a central NCP with a plurality of portable/mobile remote terminals and wherein multiple signalling formats or protocols may be accommodate concurrently on such communication system without interference therebetween, said transmitting site including in combination:

transceiver apparatus operative on the respective inbound and outbound channels;

a general communication controller interconnected between said transceiver apparatus and the NCP, said controller being programmed to operated on a predetermined, first signalling protocol;

an option board programed to operate on at least a second signaling protocol differing from said first signalling protocol, and means interfacing said option board with said controller wherein the transmitting site will accommodate either signalling protocol when the same is being utilized in the Radio Data Communication System.

13. A transmitting site for operating in an RF Radio Data Communication System in accordance with claim 12 wherein said general communications controller operates on a selected one of said signaling protocols within a particular reoccurring time slot on command of the central NCP.

* * * * *